Jan. 10, 1967  M. LISBOA  3,297,111
AUTOMOTIVE WHEEL BLOCK
Filed April 7, 1965
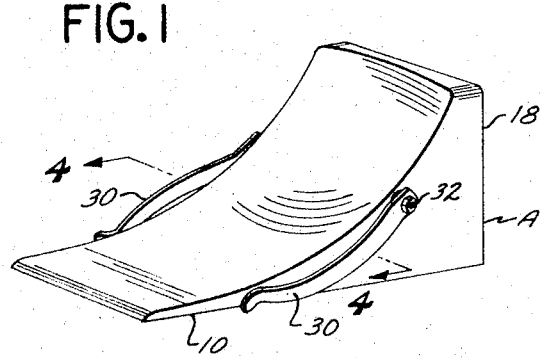
FIG. 1
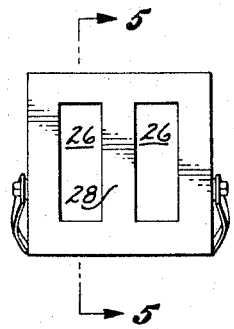
FIG. 2
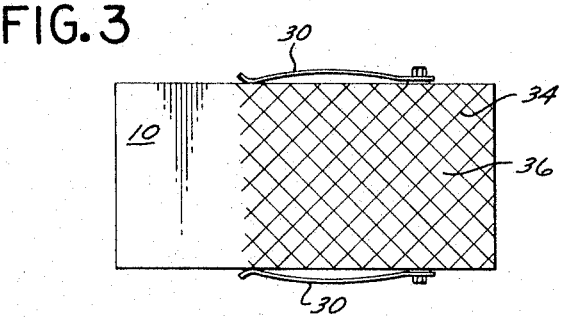
FIG. 3
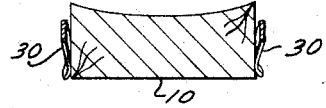
FIG. 4
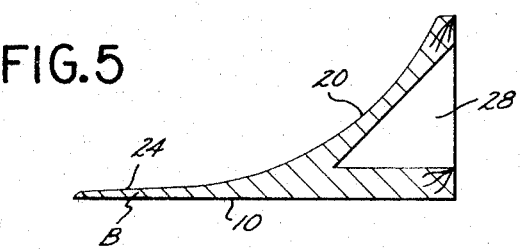
FIG. 5
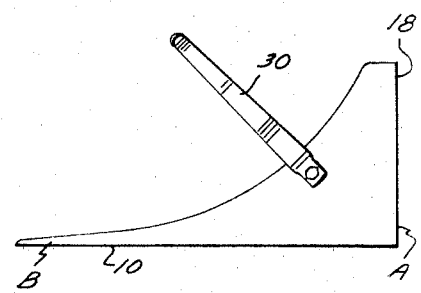
FIG. 6
FIG. 7
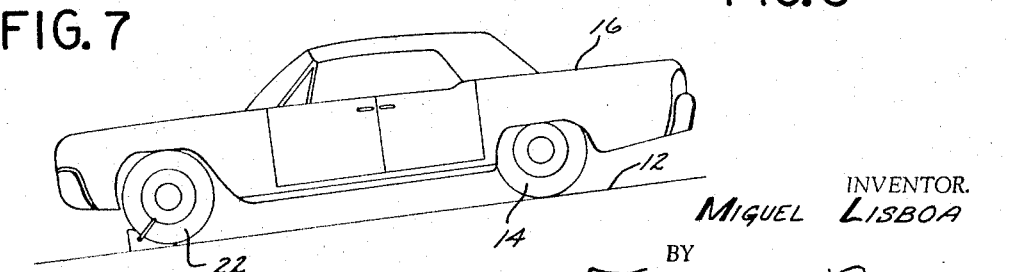
INVENTOR.
MIGUEL LISBOA
BY
William C. Bobcock
ATTORNEY United States Patent Office 3,297,111
Patented Jan. 10, 1967

3,297,111
AUTOMOTIVE WHEEL BLOCK
Miguel Lisboa, 803 E. 8th St.,
Long Beach, Calif. 90813
Filed Apr. 7, 1965, Ser. No. 446,149
1 Claim. (Cl. 188—32)

The present invention relates generally to the field of automotive accessories, and more particularly to a lightweight portable wheel block that may be carried with a vehicle for use when the occasion arises to prevent inadvertent movement of the vehicle.

Although the modern automobile is equipped with hydraulic brakes, as well as an emergency brake, the latter is used rather infrequently, and normally is not maintained in the same degree of operative efficiency as that of the hydraulic brakes. Frequently, the emergency brake, irrespective of the current peak of efficiency thereof, is used to prevent inadvertent movement of a vehicle when parked on a grade or when one or more of the vehicle wheels are raised during changing of a tire, or while other maintenance work is being done thereon. Accidents, caused by inadvertent movement of an automotive vehicle when one of its wheels is supported in a raised position for the changing of a tire, or the like, are all too frequent, and are mainly due to the defective operational condition of the emergency brake thereof, or the fact that the emergency brake had not been set properly prior to raising a portion of the vehicle to an elevated position by the use of a jack.

A major object of the present invention is to provide a relatively lightweight, compact, portable wheel block that can be conveniently carried in an automotive vehicle, and used to prevent inadvertent movement of the vehicle, either when the vehicle is parked on an inclined surface, or when one of the vehicle wheels has been raised to an elevated position to permit the changing of a wheel, or to perform other maintenance work on the vehicle.

Another object of the invention is to provide a wheel block that is easily grasped by the rear portion thereof whereby it may be easily maneuvered under or removed from blocking contact with a wheel of the vehicle.

A still further object of the invention is to provide a wheel block having a rear lower, anti-slip surface that is in contact with the floor or road surface on which the vehicle tires rest, with the design of the wheel block being such that the anti-slip surface thereof is forced into increasing pressure contact with a floor or road surface as the tire of the vehicle engaged by the block tends to roll upwardly thereon.

A still further object of the invention is to provide a wheel block that can be formed from a molded polymerizable resin including a substantial quantity of an inert filler, such as sawdust, fibers, or the like, that defines the wheel block which is adapted to be molded at a relatively low expense into the form thereof shown in the drawings on file herein.

Yet another object of the invention is to supply a wheel block which, if used properly, will completely eliminate the possibility of inadvertent movement of a vehicle when one or more of the wheels thereof are supported in an elevated position such as on a jack or the like, which creates the hazard of personal injury thereto should the elevated portion thereof fall from a jack, or like support and roll along the ground surface.

These and other objects and advantages of the automotive wheel block of the present invention will become apparent from the following description thereof, and from the accompanying drawing illustrating the same, in which:

FIGURE 1 is a perspective view of the wheel block;

FIGURE 2 is a rear elevational view of the device;
FIGURE 3 is a bottom plan view of the invention;
FIGURE 4 is a transverse cross-sectional view of the wheel block, taken on the line 4—4 of FIGURE 1;
FIGURE 5 is a longitudinal cross-sectional view of the device, taken on the line 5—5 of FIGURE 2;
FIGURE 6 is a side elevational view of the block; and
FIGURE 7 is a side elevational view of an automobile, showing the block in engagement with a front wheel of a vehicle, which prevents forward movement thereof.

With continued reference to the drawing for the general arrangement of the invention, it will be seen in FIGURE 1 to comprise a block A, preferably formed from a polymerizable resin including a filler such as sawdust, straw, or the like, to minimize the cost of the formed block.

Block A comprises an elongate, lower rectangular surface 10 that is adapted to rest on the floor or road 12, on which the wheels 14 of an automobile 16 rest, as can best be seen in FIGURE 7. Block A includes a rear end surface 18 that is positioned in a direction substantially normal to the lower surface 10 of the block. The curved forward surface 20 of Block A is concave in configuration and adapted to abut against the exterior surface of one of the tires 22 on one of the wheels 14, as best shown in FIGURE 7, and the surface 20 on the lower forward edge thereof develops into a slightly inclined surface 24, such as illustrated in FIGURE 5.

The lower surface 10 and the surface 24 of block A cooperatively define a forwardly extending tongue B which easily is engaged by one of the tires 22 of the vehicle 16 when it is driven rearwardly thereover until the tire is in abutting contact with the upper surface 20 of the block. Due to the relatively steep angularity thereof, the surface 20 prevents the tire 22 in engagement therewith from running upwardly thereon to the point where the vehicle 16 can move forwardly relative to block A when the block is disposed in the position as shown in FIGURE 7.

To permit the block A to be easily maneuvered into a position where one of the tires 22 of the vehicle 16 can be run onto the tongue B of the block, two transversely spaced recesses 26 are formed therein, which extend forwardly in the block from the rear surface 18 thereof. The recesses 26 are so spaced that the portion of the block therebetween serves as a grip 28 that may easily be grasped by the user to urge the block forwardly or rearwardly relative to one of the tires 22 of the vehicle 16.

To prevent inadvertent transverse movement of the automobile relative to one of the tires 22 (FIGURE 7), two transversely spaced tire-engaging members 30 are pivotally supported on black A, with the members 30 normally occupying the position shown in FIGURE 1. The tire-engaging members 30 are pivotally supported on coaxially aligned stud bolt assemblies 32, shown in FIGURE 1, or on the ends of a transversely positioned rod (not shown) embedded in the black A. The members 30 are movable relative to the tire-engaging positions shown in FIGURE 7 after the under surface of the tire 22 is in engagement with the surfaces 24 and 20 of the block A.

A number of grooves, serrations, or other indentations 34 are formed in the lower surface 10 of the block A, to define an anti-slip surface 36 that tends to remain in a fixed position relative the floor or road surface 12, as shown in FIGURE 7, particularly when the surface 36 is subjected to the partial weight of the vehicle 16, which is transmitted therethrough to one of the wheels 14.

The use and operation of the wheel block described herein are quite simple. The wheel block A will normally be carried in the vehicle for use therewith, and when an occasion asises for use thereof, it may be placed in a position relative the vehicle by use of grip 28 so that one of the tires 22 thereof may be run upwardly onto the surface 24 (FIGURE 7) whereby the tire engages the surface 20 which prevents inadvertent forward movement of the vehicle 16. One of the rear wheels 14 can then be elevated on a jack (not shown), and the forward movement of the vehicle 16. One of the rear wheel replaced or other maintenance work performed on the vehicle 16, without the hazard of unexpected forward movement of the vehicle. After the rear wheel 14 has been changed, or the maintenance work completed, the members 30 are then moved out of engagement with the forward tire, as illustrated in FIGURE 7, whereby the members occupy the position shown in FIGURE 1.

The vehicle 16 is then backed rearwardly relative to the block A, as illustrated in FIGURE 7, and the block A stored for future use in the automobile 16. Of course, the wheel block A previously described may be used in a garage or other desired location for the purpose described herein.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claim.

I claim:

A wheel block for use in preventing inadvertent movement of an automotive vehicle, including:
 (a) a block of rigid non-metallic material having a forwardly extending tongue on which the tire of a vehicle rests, with said block also including an upwardly curved surface rearwardly of said tongue against which said tire abuts when resting on said tongue, which block has a flat lower surface and an upwardly extending rear end surface, with said end surface having two transversely spaced recesses formed therein that extend forwardly therefrom and cooperatively define a hand grip therebetween that can be grasped by the user in disposing said block in a position relative to the wheel of said vehicle to prevent inadvertent movement thereof;
 (b) two elongate tire-engaging members disposed on opposite sides of said block; and
 (c) means for pivotally supporting said tire-engaging members from said block, with said members when not in use extending along opposite longitudinal sides of said block being substantially parallel to said lower surface thereof, and which members are used to engage a tire that is not appreciably greater in width than said block when said members are pivoted to an upwardly extending position while said tire rests on said tongue, with said members being automatically disengaged from said tire when said wheel supporting said tire rotates in a direction to move away from said upwardly extending rear surface when in use extend upwardly above said block to removably engage opposite sides of said tire that is in engagement with said upwardly and rearwardly curving surface.

References Cited by the Examiner

UNITED STATES PATENTS

| 1,376,114 | 4/1921 | Raney. | |
| 2,797,774 | 7/1957 | Eckhart | 188—32 |

FOREIGN PATENTS 1,305,914  8/1962  France.

DUANE A. REGER, *Primary Examiner.*